U S010003255B1

United States Patent
Jull et al.

(10) Patent No.: US 10,003,255 B1
(45) Date of Patent: Jun. 19, 2018

(54) VID-CONTROLLED VOLTAGE REGULATOR WITH AUDIBLE NOISE CORRECTION

(71) Applicant: Monolithic Power Systems Inc., San Jose, CA (US)

(72) Inventors: Jeffrey Jull, Hillsboro, OR (US); Qian Li, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days. days.

(21) Appl. No.: 15/383,892

(22) Filed: Dec. 19, 2016

(51) Int. Cl.
*H02M 3/04* (2006.01)
*G06F 1/28* (2006.01)

(52) U.S. Cl.
CPC ............... *H02M 3/04* (2013.01); *G06F 1/28* (2013.01)

(58) Field of Classification Search
CPC ..... G06F 1/28; G06F 1/26; G06F 1/00; G06F 1/3203; G06F 1/32; G06F 1/16; H02M 3/04

See application file for complete search history.

(56) References Cited

U.S. PATENT DOCUMENTS

| 7,363,523 | B2 | 4/2008 | Kurts et al. | |
|---|---|---|---|---|
| 7,472,289 | B2 | 12/2008 | Rodriguez et al. | |
| 8,291,242 | B2* | 10/2012 | Chiu | G06F 1/26 323/282 |
| 8,410,768 | B2* | 4/2013 | Huber | H02M 3/156 323/284 |
| 8,791,676 | B2 | 7/2014 | Liu | |
| 9,276,460 | B2* | 3/2016 | Telefus | H02M 1/44 |
| 2009/0249092 | A1* | 10/2009 | Lam | G06F 1/26 713/310 |
| 2015/0195882 | A1* | 7/2015 | Chu | H05B 33/0842 315/185 R |

* cited by examiner

*Primary Examiner* — Emily P Pham
(74) *Attorney, Agent, or Firm* — Perkins Coie LLP (57) ABSTRACT

A method for correcting audible noise from a voltage regulator due to a change of a VID indicated by a series of VID commands. A VID difference between a current value and a target value of the VID is compared with a VID threshold when a VID command for changing the VID from the current value to the target value is received. The VID is held at the current value if the VID difference is larger than the VID threshold. And the VID command is executed if a holding duration for holding the VID at the current value expires and no new VID command for changing the VID is received before the expiration of the holding duration.

20 Claims, 6 Drawing Sheets

VID-CONTROLLED VOLTAGE REGULATOR WITH AUDIBLE NOISE CORRECTION

FIELD OF THE INVENTION

The present invention relates generally to voltage regulators, and more particularly but not exclusively to the correction of audible noise from the voltage regulators.

BACKGROUND OF THE INVENTION

Audible noise is an undesired physical manifestation caused by a motherboard flexing at a frequency in the audible range, in response to voltage changes across capacitors, especially ceramic capacitors, on the motherboard due to the inherent Piezoelectric phenomenon of the capacitor.

One conventional approach to eliminate the audible noise is to control the voltage change of the voltage identification (VID) signal sent from a master device (e.g., CPU) to a voltage regulator when the master device is transited from the present state to a lower power state. The VID is either changed to a VID value higher than the target value associated with the lower power state to reduce the voltage change, or set to have the same value as that of the present state so that no voltage change presents. Power loss is a big issue in such an approach as the VID is always kept at a higher VID value even when the condition creating the audible noise subsides.

As another conventional approach to eliminate the audible noise, Intel Corporation provides the users an ability to slow down the ramp rates of the voltage change. However, this does not always solve the issue, and can reduce or eliminate the duration that the platform can go into the lower power state.

An approach at least addressing the above-mentioned issue is thus desired.

SUMMARY

Embodiments of the present invention are directed to a method for correcting audible noise from a voltage regulator for supplying a voltage to a master device responsive to a VID indicated by a series of VID commands from the master device. The method comprises comparing a VID difference between the current value and a target value of the VID with a VID threshold when a VID command for changing the VID from the current value to the target value is received; holding the VID at the current value if the VID difference is larger than the VID threshold; and executing the VID command if a holding duration for holding the VID at the current value expires and no new VID command for changing the VID is received before the expiration of the holding duration. The target value is lower than the current value;

Embodiments of the present invention are also directed to a controller for controlling a voltage driver supplying a voltage to a master device responsive to a VID from the master device. The controller comprises a calculation module, a first comparison module, a delay module and a modulation module. The calculation module is configured to receive a current value and a target value of the VID and to calculate a VID difference between the current value and the target value. The first comparison module is configured to compare the VID difference with a VID threshold and to provide a first comparison signal. The VID threshold is positive. The delay module is configured to receive the first comparison signal and to generate a delay signal based on the first comparison signal. The delay signal is asserted when the first comparison signal indicates that the VID difference is larger than the VID threshold and deasserted after a holding duration. The modulation module is configured to receive the delay signal, and the current value and the target value of the VID. The modulation module is configured to generate a control signal to control the voltage driver based on the current value of the VID when the delay signal is asserted and based on the target value when the delay signal is deasserted.

Embodiments of the present invention are further directed to a voltage regulator. The voltage regulator comprises a voltage driver and a controller. The voltage driver is configured to supply a voltage to a master device responsive to a VID from the master device. The controller comprises a calculation module, a first comparison module, a delay module and a modulation module. The calculation module is configured to receive a current value and a target value of the VID and to calculate a VID difference between the current value and the target value. The first comparison module is configured to compare the VID difference with a VID threshold and to provide a first comparison signal. The VID threshold is positive. The delay module is configured to receive the first comparison signal and to generate a delay signal based on the first comparison signal. The delay signal is asserted when the first comparison signal indicates that the VID difference is larger than the VID threshold and deasserted after a holding duration. The modulation module is configured to receive the delay signal, and the current value and the target value of the VID. The modulation module is configured to generate a control signal to control the voltage driver based on the current value of the VID when the delay signal is asserted and based on the target value when the delay signal is deasserted.

Embodiments of the present invention are further directed to a controller for controlling a voltage driver supplying a voltage to a master device responsive to a VID from the master device. The controller comprises a comparison module, a delay module, and a modulation module. The comparison module is configured to compare a current value with a target value of the VID and to provide a comparison signal. The delay module is configured to receive the comparison signal and to generate a delay signal based on the comparison signal. The delay signal is asserted when the comparison signal indicates that the target value is lower than the current value and deasserted after a holding duration. The modulation module is configured to receive the delay signal, and the current value and the target value of the VID. The modulation module is configured to generate a control signal to control the voltage driver based on the current value of the VID when the delay signal is asserted and based on the target value when the delay signal is deasserted.

Embodiments of the present invention are further directed to a voltage regulator. The voltage regulator comprises a voltage driver and a controller. The voltage driver is configured to supply a voltage to a master device responsive to a VID from the master device. The controller comprises a comparison module, a delay module, and a modulation module. The comparison module is configured to compare a current value with a target value of the VID and to provide a comparison signal. The delay module is configured to receive the comparison signal and to generate a delay signal based on the comparison signal. The delay signal is asserted when the comparison signal indicates that the target value is lower than the current value and deasserted after a holding duration. The modulation module is configured to receive the delay signal, and the current value and the target value of the VID. The modulation module is configured to generate a control signal to control the voltage driver based on the current value of the VID when the delay signal is asserted and based on the target value when the delay signal is deasserted.

DESCRIPTION OF THE DRAWINGS

The present invention can be further understood with reference to the following detailed description and the appended drawings, wherein like elements are provided with like reference numerals.

DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references. And further, the meaning of "correct" may refer to "reduce" and/or "eliminate" throughout the specification.

Figure 1:
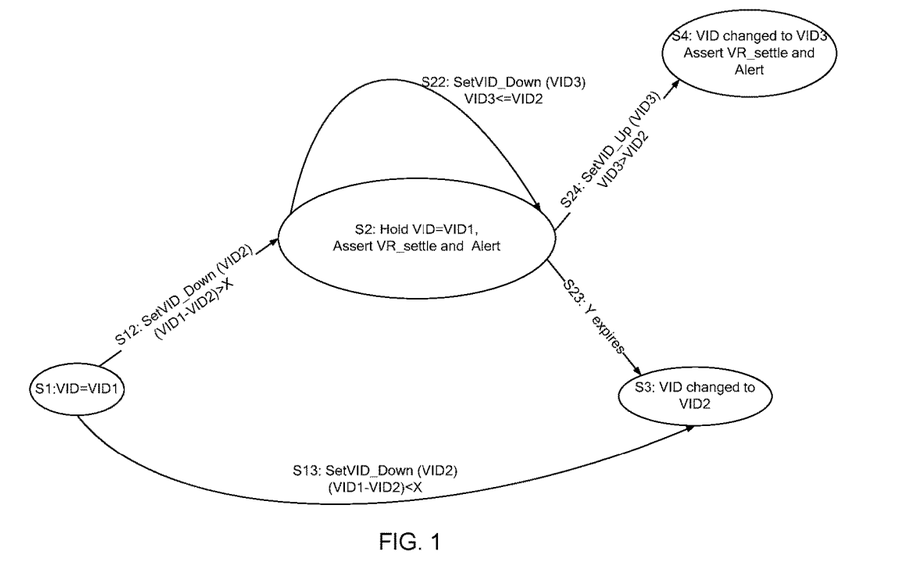
FIG. 1 shows an exemplary state diagram illustrating the method for correcting audible noise from a voltage regulator in accordance with an embodiment of the present invention.

FIG. 1 shows an exemplary state diagram illustrating the method for correcting audible noise from a voltage regulator in accordance with an embodiment of the present invention. The voltage regulator is configured to supply a voltage to a master device, e.g., a central processing unit (CPU), responsive to a voltage identification code (VID) indicated by a series of VID commands from the master device. A specific value of the VID indicated by a VID command corresponds to a specific voltage desired by the master device X01 associated with a specific power state of the master device X01. Referring to FIG. 1, the VID has an initial value (a current value) VID1 in the initial state S1. When a VID command SetVID_Down (VID2) for changing the VID from the current value VID1 to a lower target value VID2 is received, a VID difference DVID between the current value VID1 and the lower target value VID2 of the VID may be calculated (DVID=VID1−VID2) and may then be compared with a VID threshold X which is a non-negative number. In one embodiment, the VID threshold X is programmable. If the VID difference DVID is lower than the VID threshold X ((VID1−VID2)<X) as shown in a state transition S13, the state of the voltage regulator is transited from the initial state S1 to a state S3 immediately when the VID command SetVID_Down (VID2) is received. In the state S3, the VID command SetVID_Down (VID2) is executed and the VID decreases until the lower target value VID2 is reached. On the contrary, if the VID difference DVID is larger than the VID threshold X ((VID1−VID2)>X) as shown in a state transition S12, the voltage regulator transits from the initial state S1 to a state S2 where the VID is held at the current value VID1 (VID=VID1).

Persons of ordinary skill in the art will recognize that as a particular case of the embodiment shown in FIG. 1, when the VID threshold X is set as X=0, the voltage regulator transits from the initial state S1 to a state S2 to hold the VID at the current value VID1 if (VID1−VID2)>0, which means, in other words, the VID is held at the current value VID1 as long as a VID command for changing the VID from the current value VID1 down to a lower target value VID2 is received, regardless of the value of the VID difference DVID.

In one embodiment, in the state S2, a VR_settle signal may be deasserted from the beginning of the VID holding process, i.e. since the moment when the SetVID_Down (VID2) command is received, and asserted at the end of a settle duration $T_{SETL}$. In one embodiment, the settle duration $T_{SETL}$ may be programmable depending on the design of the voltage regulator. For a particular example, it may be less than 1 us. In yet another embodiment, the VR_settle signal may be deasserted by way of transiting to a logic low state and asserted by way of transiting to a logic high state. In a further embodiment, an alert signal may be then asserted by the assertion of the VR_settle signal to prompt the master device to read the information of a status register inside the voltage regulator to avoid a conflict with any other subsequent VID command that may come in and preempt the VID holding process. The information may comprise the VR_settle signal in one embodiment. Further, in one embodiment, the alert signal can be deasserted anytime after the master device reads the information. In another embodiment, the alert signal may be asserted by way of transiting to a logic low state and deasserted by way of transiting to a logic high state.

Figure 2:
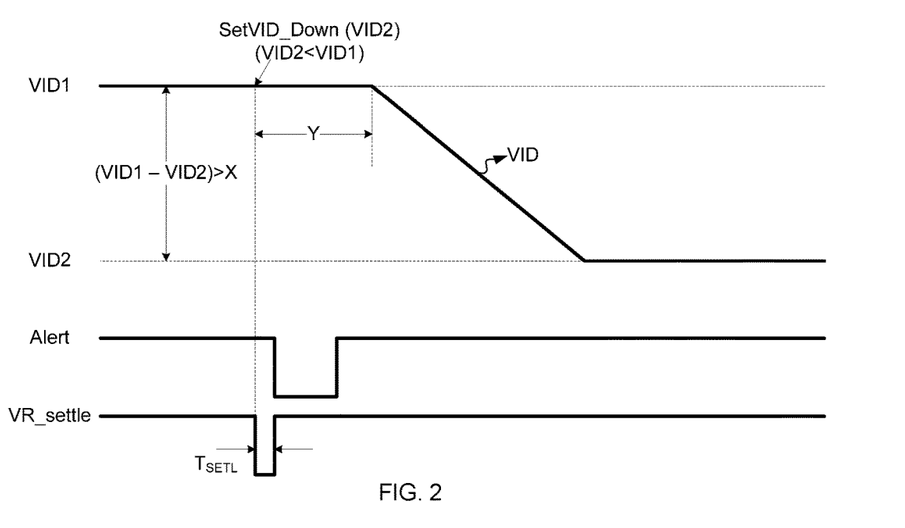
FIG. 2~FIG. 5 show a series of waveforms illustrating the operation of the voltage regulator in four different cases under the situation of (VID1−VID2)>X.
Figure 3:
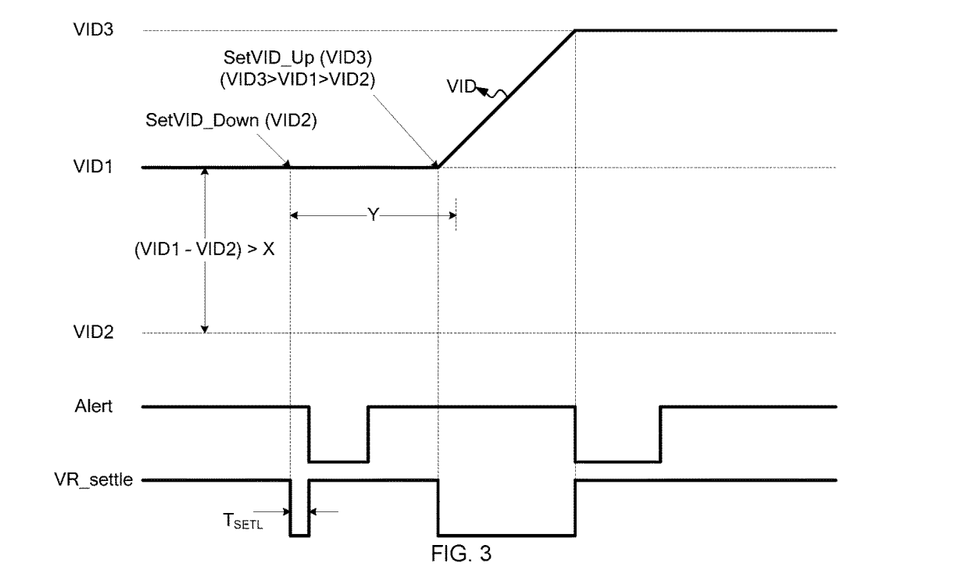
Figure 4:
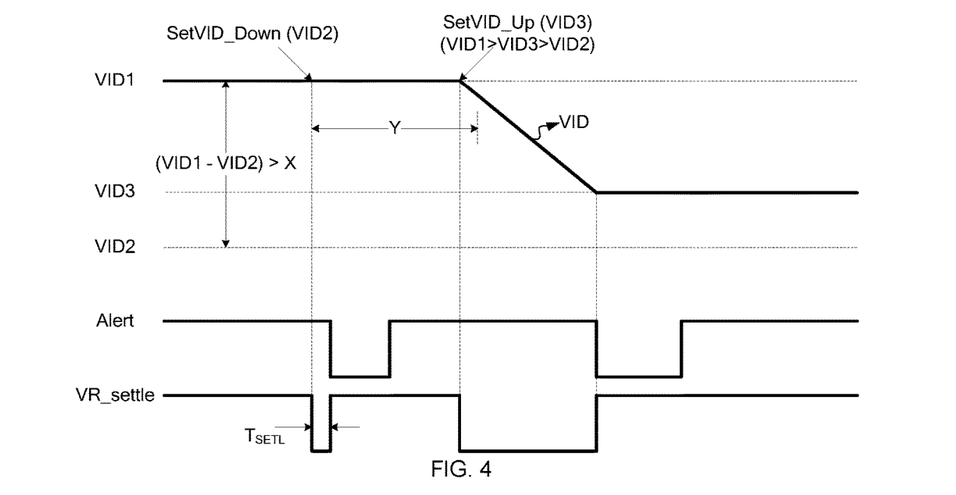
Figure 5:
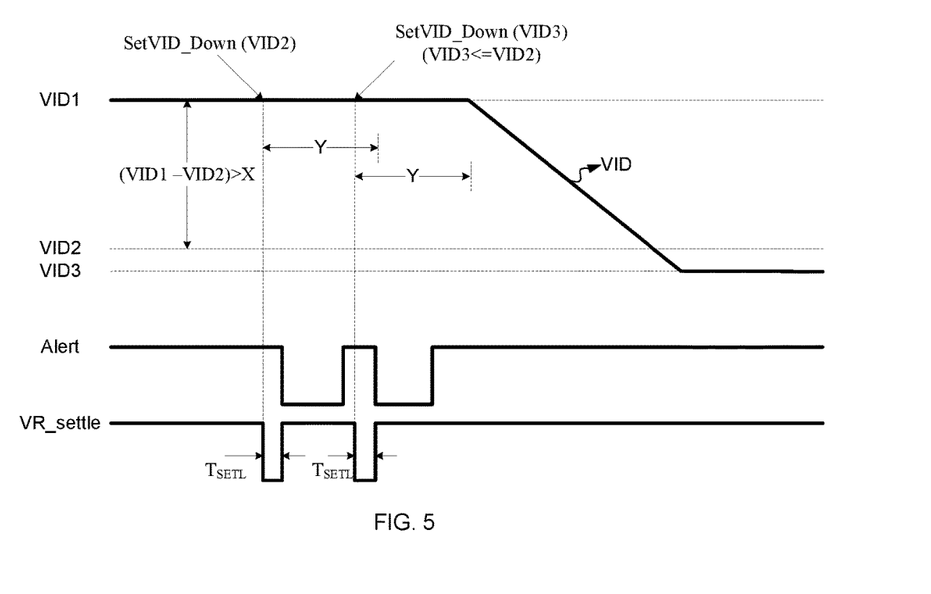

FIG. 2~FIG. 5 show a series of waveforms illustrating the operation of the voltage regulator in four different cases under the situation of (VID1−VID2)>X. The waveforms in FIG. 2~FIG. 5 show the current value VID1 of the VID, the VID, the lower target value VID2 of the VID, an alert signal and a VR_settle signal. In addition, a new target value VID3 of the VID is also shown in FIG. 3~FIG. 5. The operation of the voltage regulator under the situation of (VID1−VID2)>X will now be set forth with reference to FIG. 1~FIG. 5.

As shown in FIG. 1 and FIG. 2, if a holding duration Y for holding the VID at the current value VID1 expires and no new VID command for changing the VID is subsequently received after the SetVID_Down (VID2) command before the expiration of the holding duration Y as shown in a state transition S23, the voltage regulator transits from the state S2 to the state S3 where the VID command SetVID_Down (VID2) is executed and the VID decreases until the lower target value VID2 is reached. In one embodiment, the holding duration Y may be programmable. As a particular case, the holding duration Y may be such programmed that the VID is held at the current value VID1 until a next command for changing the VID from the target value VID2 back to the current value VID1. In other words, the Set-VID_Down (VID2) command is blanked in such a particular case. And in another embodiment, the holding duration Y may be pre-stored in the status register.

As shown in FIG. 1, if a new VID command SetVID_Up (VID3) for changing the VID to a new target value VID3 which is larger than the previous target value VID2 is subsequently received after the SetVID_Down (VID2) command within the holding duration Y as shown in a state transition S24, the state of the voltage regulator is transited from the state S2 to a state S4 immediately when the new VID command SetVID_Up (VID3) is received to change the VID until the new target value VID3 is reached. FIG. 3 and FIG. 4 both show the execution of the new VID command SetVID_Up (VID3) when the new VID command Set-VID_Up (VID3) is received within the holding duration Y. In more particular, FIG. 3 shows the operation of the voltage regulator when the new target value VID3 is higher than the current value VID1, while FIG. 4 illustrates the operation of the voltage regulator when the new target value VID3 is lower than the current value VID1 but higher than the previous target value VID2. In FIG. 3, the VID slews up until the new target value VID3 is reached in the state S4, while in FIG. 4, the VID slews down until the new target value VID3 is reached in the state S4. With continuing reference to FIG. 1~FIG. 3, in one embodiment, the VR_settle signal is deasserted when the new VID command SetVID_Up (VID3) is received and asserted when the execution of the new VID command SetVID_Up (VID3) is completed, i.e., when the VID reaches the new target value VID3. In further another embodiment, the alert signal is asserted by the assertion of the VR_settle signal to prompt the master device to read the information of the status register so as to carry out the next operation.

As shown in FIG. 1 and FIG. 5, if a new VID command SetVID_Down (VID3) for changing the VID from the current value VID1 to a new target value VID3 which is lower than the previous target value VID2 is subsequently received after the SetVID_Down (VID2) command within the holding duration Y, the VID is held at the current value VID1 for a new cycle of the holding duration Y (i.e., the holding duration Y is reset when the new VID command SetVID_Down (VID3) is received) as shown in a state transition S22. And similarly as when the VID command SetVID_Down (VID2) is received, the VR_settle signal is deasserted when the new VID command SetVID_Down (VID3) is received and asserted at the end of the settle duration $T_{SETL}$ in one embodiment. In a further embodiment, the alert signal is asserted by the assertion of the VR_settle signal to prompt the master device to read the information of the status register so as to avoid a conflict with any other subsequent VID command that may come in and preempt the VID holding process.

Persons of ordinary skill in the art will recognize that the audible noise correction method according to FIG. 1~FIG. 5 may be initiated by user, instead of being initiated automatically in some embodiments. When the audible noise is heard, information such as the rail of a multi-phase voltage regulator, the amplitude of the audible noise, and the frequency of the audible noise, etc. may be identified for the user to program values such as the VID threshold X or the holding duration Y. In such embodiments, an interface is provided for user's interaction to implement the method.

Figure 6:
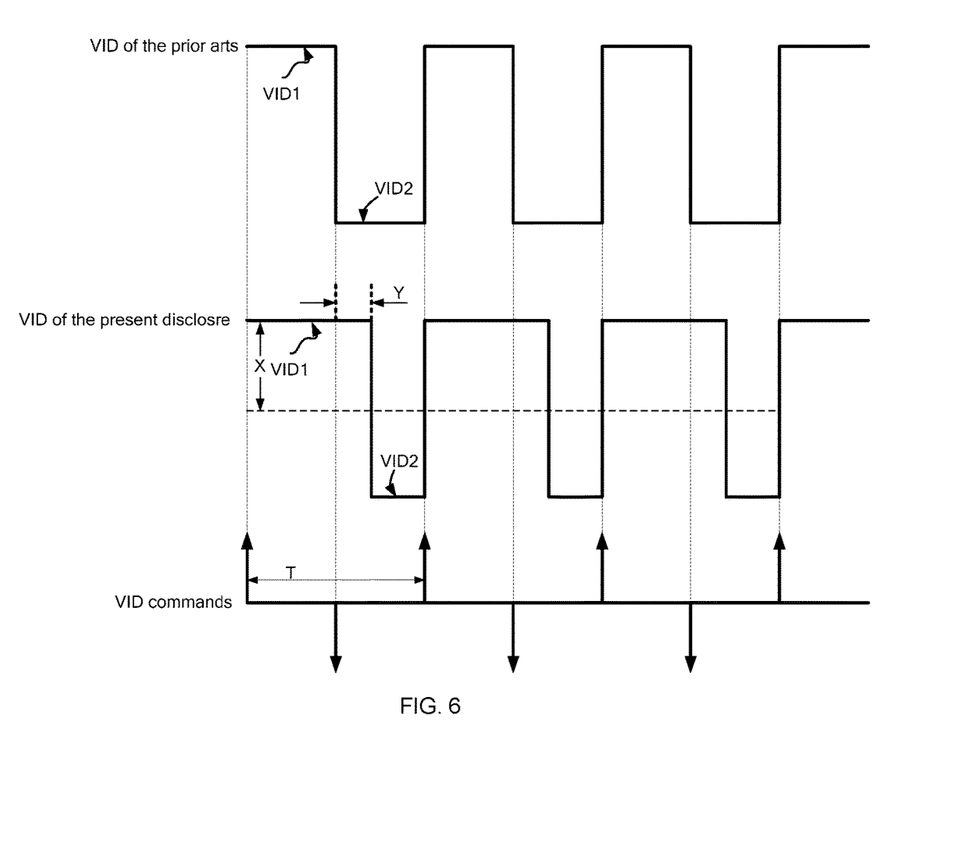
FIG. 6 shows a series of waveforms illustrating the principle of the audible noise correction with the method as illustrated in FIG. 1.

FIG. 6 shows a series of waveforms illustrating the principle of the audible noise correction with the method as illustrated in FIG. 1. From top to bottom, the waveforms respectively represent the VID without any delay according to the prior arts, the VID according to the present invention and a series of VID commands. Referring to FIG. 6, a series of VID commands for changing the VID from a lower value VID2 to a higher value VID1 and from the higher value VID1 back to the lower value VID2 are issued alternately and periodically from the master device, e.g., in accordance with the repeating transition of two different power states. The time duration between two adjacent VID commands for changing the VID from the higher value VID1 to the lower value VID2 (or two adjacent VID commands for changing the VID from the lower value VID2 to the higher value VID1) is denoted as the duration T as shown in FIG. 6, and the time duration when the VID is at the target value VID2 for each cycle is denoted as T1 for easy description. The duty cycle of the VID is defined as the ratio of the time duration T1 to the duration T. As can be seen from FIG. 6, by holding the VID at the current value VID1 for the additional holding duration Y when the VID difference DVID is larger than the VID threshold X, the duty cycle of the VID can be decreased in the present discloser compared with that of the VID in the prior arts, which is thus able to reduce or to eliminate the vibrations caused by the motherboard, and consequently, to reduce or to eliminate the audible noise in the audible range, or at least the audible noise at some particular audible frequency.

Figure 7:
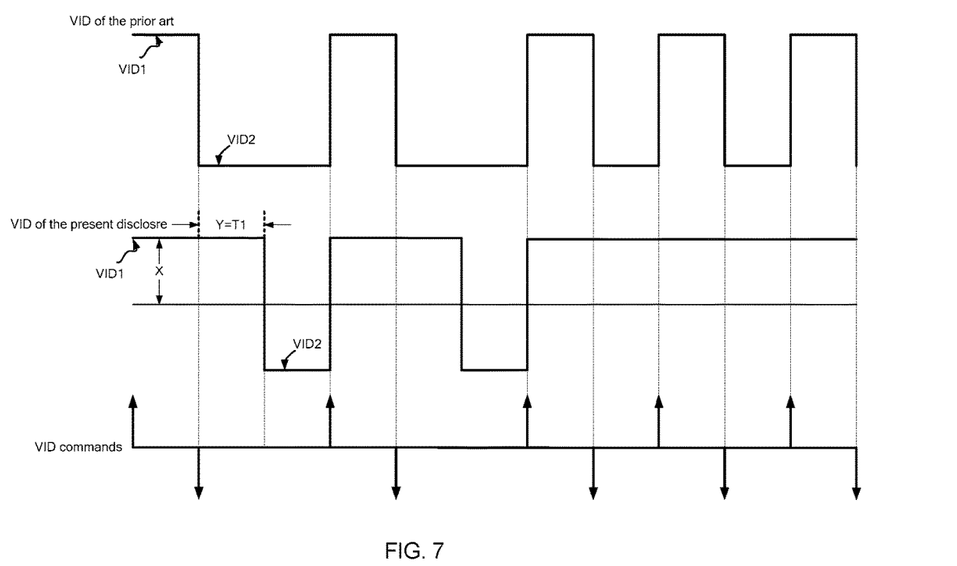
FIG. 7 shows a series of waveforms illustrating the elimination of the audible noise by setting the holding duration Y=T1 in accordance with the method of FIG. 1.

As a particular case of FIG. 6, FIG. 7 shows a series of waveforms illustrating the elimination of the audible noise by setting the holding duration Y=T1 in accordance with the method of FIG. 1. As shown in FIG. 7, the holding duration Y is programmed to have a value of the time duration T1. In such way, on one hand, as shown by the right side of FIG. 7, if VID commands for changing the VID from a lower value VID2 to a higher value VID1 and from the higher value VID1 back to the lower value VID2 are issued alternately and periodically, in which case, the power saving itself functions less efficiently due to the frequent transition from the low power state to the high power state, the VID is held at the higher value VID1 steadily, which guarantees no noise and meanwhile affects little on the power consumption. On the other hand, as shown by the left side of FIG. 7, when there is no VID command for changing the VID from the lower value VID2 to the higher value VID1 issued at the end of the duration T, the VID is changed from the lower value VID2 to the higher value VID1 after the lasted holding duration expires, which helps to save power and meanwhile to reduce the audible noise due to the delay.

The programmable audible noise correction method described above can be implemented to provide the customer an option when they run into an audible noise issue. By programming the VID threshold and/or the holding duration Y, the customer can find a setting to reduce or to eliminate the audible noise. Thus, the customer is able to make a decision between the audible noise correction and the power consumption.

Figure 8:
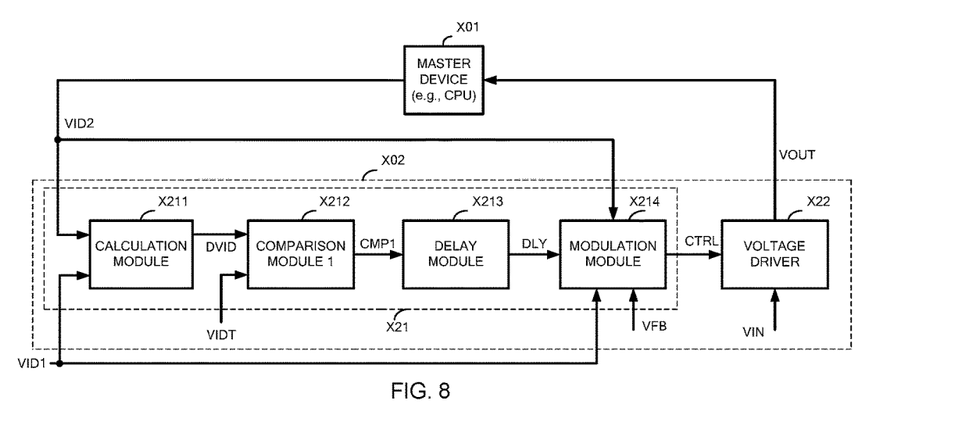
FIG. 8 illustrates a voltage regulator X02 for supplying a voltage VOUT to a master device X01 in accordance with an embodiment of the present invention.

FIG. 8 illustrates a voltage regulator X02 for supplying a voltage VOUT to a master device X01 in accordance with an embodiment of the present invention. The master device X01 may include a central processing unit (i.e. CPU) in one embodiment but, of course, other embodiments may be contemplated where other appropriate devices are employed. The master device X01 issues a voltage identification (VID) signal with a specific value to indicate a specific voltage desired by the master device X01 associated with a specific power state of the master device X01. In operation, the master device X01 may transit between various power states responsive to various events and/or conditions, which in turn results in a change of the value of the VID. For easy description, the current value of the VID corresponding to the current voltage value provided to the master device X01 is denoted as VID1, while a target value of the VID corresponding to the power state the master device X01 transits to is denoted as VID2 and a new target value of the VID received after the target value VID2 within a holding duration Y which will become apparent soon is denoted as VID3 in the following description.

In response to the VID, the voltage regulator X02 is configured to provide the voltage VOUT to the master device X01 for supporting the operation of the master device X01. As shown in FIG. 8, the voltage regulator X02 is illustrated to comprise a controller X21 and a voltage driver X22. The controller X21 is configured to generate a control signal CTRL based on a target value VID2 of the VID received from the master device X01, the current value VID1 of the VID, a VID threshold VIDT. The controller X21 may generate the control signal CTRL further based on a feedback signal VFB representative of the voltage VOUT. In one embodiment, the VID threshold VIDT is positive. The control signal CTRL is then provided to the voltage driver X22 to control the switching actions of the voltage driver X22 so that an input voltage VIN is converted into the voltage VOUT. In one embodiment, the voltage driver X22 may be implemented with conventional buck, boost, buck-boost or other appropriate switching topologies capable of converting the input voltage VIN into the output voltage VOUT through turning on and off the switches inside the switching topologies.

With continuing reference to FIG. 8, the controller X21 is illustrated to comprise a calculation module X211, a first comparison module X212, a delay module X213, and a modulation module X214. The calculation module X211 is configured to receive the current value VID1 as well as the target value VID2 of the VID, and to calculate a difference DVID between the current value VID1 and the target value VID2, i.e., DVID=VID1−VID2. In one embodiment, the target value VID2 of the VID may be received by the calculation module X211 from the master device X01 over a bus line when a VID command for changing the VID from the current value VID1 to the target value VID2 is received in response to a power state transition. In another embodiment, the current value VID1 corresponding to the current voltage VOUT provided to the master device X01 may be stored in a register inside the controller X02 (not shown) and then be read by the calculation module X211 when needed.

The first comparison module X212 is coupled to the calculation module X211 to receive the VID difference DVID. In addition, the VID threshold VIDT is provided to the first comparison module X212. The first comparison module X212 is configured to compare the VID difference DVID with the VID threshold VIDT and to thereby generate a first comparison signal CMP1. In one embodiment, the first comparison signal CMP1 is activated, for example, the first comparison signal CMP1 going to logic high (1) when the VID difference DVID is higher than the VID threshold VIDT, and is deactivated, for example, the first comparison signal CMP1 going to logic low (0) when the VID difference DVID is lower than the VID threshold VIDT.

The delay module X213 is coupled to the first comparison module X212 to receive the first comparison signal CMP1, and is configured to generate a delay signal DLY based on the received comparison signal CMP1. In more detail, the delay signal DLY is asserted (e.g., transiting from logic low to logic high) by the activation of the first comparison signal CMP1 and starts timing. And after a predetermined holding duration Y, the delay signal DLY is deasserted (e.g., transiting from logic high to logic low). On the contrary, when the first comparison signal CMP1 is deactivated, the delay signal DLY stays in the deactivated state (e.g., logic low). In one embodiment, the delay module X213 is implemented with a timer.

The modulation module X214 is coupled to the delay module X213 to receive the delay signal DLY. Further, the modulation module X214 is configured to receive the feedback signal VFB representative of the voltage VOUT, the current value VID1 and the target value VID2 of the VID. Under the control of the delay signal DLY, the modulation module X214 is configured to generate the control signal CTRL based on the feedback signal VFB and either the current value VID1 or the target value VID2 of the VID. In more detail, the modulation module X214 is configured to employ the target value VID2 for the generation of the control signal CTRL when the delay signal DLY is deasserted. Otherwise, the current value VID1 is employed by the modulation module X214 to generate the control signal CTRL.

Figure 9:
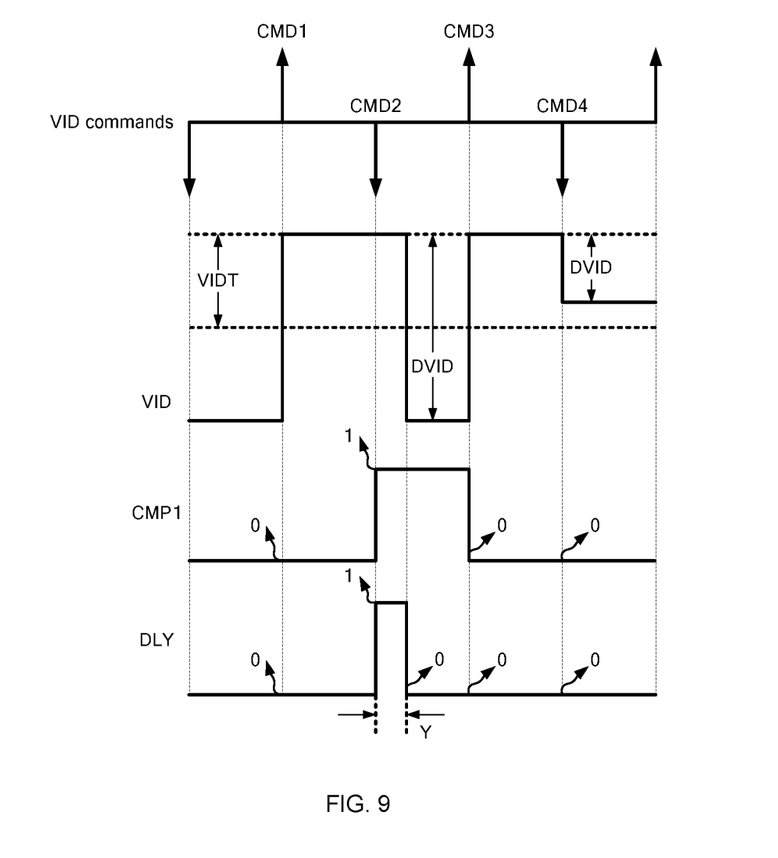
FIG. 9 illustrates a series of waveforms showing the operation of the voltage regulator X02 of FIG. 8.

In this way, as shown in FIG. 9, when the master device X01 issues a VID command (e.g., CMD1 and CMD3 in FIG. 9) for changing the VID from the current value VID1 to the target value VID2 higher than the current value VID1, the VID difference DVID between the current VID value VID1 and the target value VID2 is negative and is, of course, lower than the VID threshold VIDT, which in turn results in a deactivated first comparison signal CMP1 (e.g., CMP1=0), setting the delay signal DLY deactivated (e.g., DLY=0) at the output of the delay module X213. As a result, the modulation module X214 employs the target value VID2 to generate the control signal CTRL. In other words, the VID command for changing the VID from the current value VID1 to a higher target value VID2 is executed immediately when it is received in accordance with the embodiments of the present invention. Consequently, a desired voltage VOUT can be timely provided to the master device X01 to carry out the operation the master device X01 has in its queue, which ensures the speed of the platform.

Similarly, as shown in FIG. 9, when the master device X01 issues a VID command (e.g., CMD4 in FIG. 9) for changing the VID from the current value VID1 to a target value VID2 being lower than the current value VID1 and causing the VID difference lower than the VID threshold VIDT, in which case, audible noise may be not easily produced, the VID command is executed immediately when it is received in accordance with the embodiments of the present invention.

On the other hand, when the target value VID2 is lower than the current value VID1 and the VID difference DVID is larger than the VID threshold VIDT (e.g., CMD2 in FIG. 9), the first comparison signal CMP1 is activated (e.g., CMP1=1). Triggered by the activation of the first comparison signal CMP1, the delay module X213 activates the delay signal DLY (e.g., DLY=1) and starts timing. Before the expiration of the holding duration Y, the modulation module X214 employs the current value VID1 to generate the control signal CTRL. While when the holding duration Y times out, the delay signal DLY transits from the activated state (e.g., DLY=1) to the deactivated state (e.g., DLY=0), which in turn causes the modulation module X214 to employ the target value VID2 to generate the control signal CTRL. Therefore, in accordance with the embodiments of the present invention, the execution of the VID command for changing the VID from the current value VID1 to the lower target value VID2 is delayed for a time period of the holding duration Y when it is judged that the VID difference DVID is larger than the VID threshold VIDT, and the audible noise can be thus corrected. Persons of ordinary skill in the art will recognize that the audible noise may be reduced or eliminated, depending on the specific situations, by saying it is corrected herein.

Figure 10:
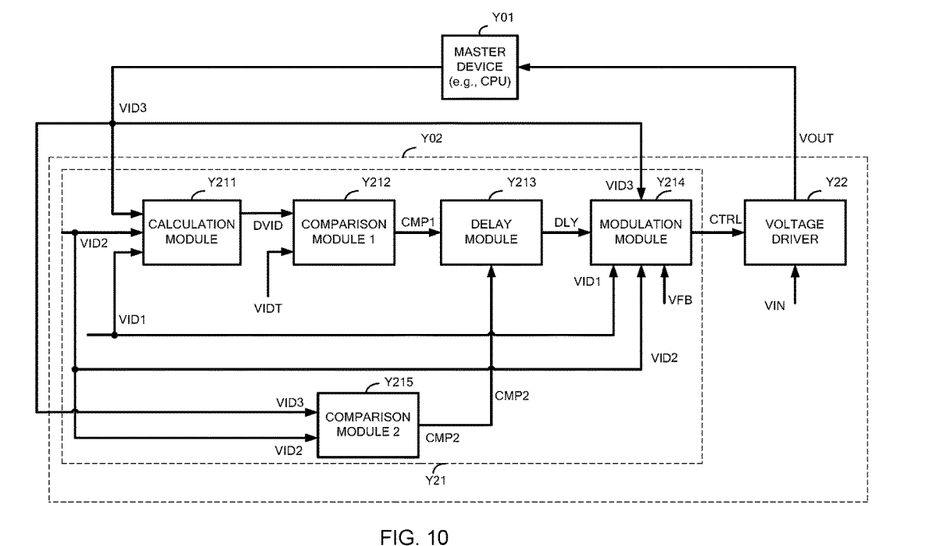
FIG. 10 illustrates another voltage regulator Y02 for supplying a voltage VOUT to a master device Y01 in accordance with an embodiment of the present invention.

FIG. 10 illustrates another voltage regulator Y02 for supplying a voltage VOUT to a master device Y01 in accordance with another embodiment of the present invention. The voltage regulator Y02 shown in FIG. 10 has a similar configuration compared with the voltage regulator X02 in FIG. 8, thus, only the different parts between the voltage regulators X02 and Y02 are emphasized and the same parts therebetween are not described herein for the purpose of clarity.

The voltage regulator Y02 further comprises a second comparison module Y215 compared with the voltage regulator Y02. The second comparison module Y215 is configured to compare a new target value VID3 with the target value VID2 if the new target value VID3 is issued from the master device Y01 within the holding duration Y, and to thereby generate a second comparison signal CMP2. In one embodiment, to accomplish the functionality of judging whether the new target value VID3 is issued within the holding duration Y, the second comparison module Y215 may be coupled to the delay module Y213 to receive the delay signal DLY. And under the control the delay signal DLY, the second comparison module Y215 is disabled when the delay signal DLY is deactivated and is enabled when the delay signal DLY is activated. In this way, the second comparison module Y215 will only perform to compare the new target value VID3 with the previous target value VID2 within the holding duration Y.

In the voltage regulator Y02, the delay module Y213 is further coupled to the second comparison module Y215 to receive the second comparison signal CMP2. The delay module Y213 is configured to generate the delay signal DLY further based on the second comparison signal CMP2 in addition to the first comparison signal CMP1 during the holding duration Y. On one hand, the delay signal DLY is deasserted when the second comparison signal CMP2 indicates that the new target value VID3 is larger than the previous target value VID2 regardless of the state of the delay signal DLY. That is, when the second comparison signal CMP2 indicates that the new target value VID3 is larger than the target value VID2, the delay signal DLY is deasserted no matter whether the holding duration is completed. On the other hand, the delay signal DLY is asserted when the second comparison signal CMP2 indicates that the new target value VID3 is lower than the target value VID2 and the holding duration Y is reset to be asserted.

The modulation module Y214 is further configured to receive the new target value VID3 and to generate a control signal CTRL based on the new target value VID3 when the delay signal DLY is deasserted if the new target value VID3 is received within the holding duration.

In one embodiment, the previous target value VID2 may be stored in the register.

Figure 11:
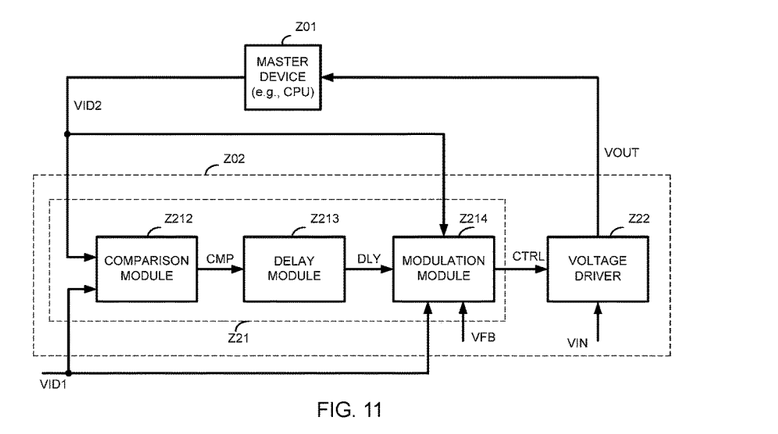
FIG. 11 illustrates another voltage regulator Z02 for supplying a voltage VOUT to a master device Z01 in accordance with an embodiment of the present invention.

FIG. 11 illustrates another voltage regulator Z02 for supplying a voltage VOUT to a master device Z01 in accordance with another embodiment of the present invention. The voltage regulator Z02 shown in FIG. 11 has a similar configuration compared with the voltage regulator X02 in FIG. 8, thus, only the different parts between the voltage regulators X02 and Z02 are emphasized and the same parts therebetween are not described herein for the purpose of clarity.

As shown in FIG. 11, the voltage regulator Z02 comprises a comparison module Z212 which is configured to receive the current value VID1 and a target value VID2 of the VID. The comparison module Z212 compares the current value VID1 with the target value VID2 and generates a comparison signal CMP. The delay module Z213 is coupled to the comparison module Z212 to receive the comparison signal CMP and generates a delay signal DLY based on the comparison signal CMP. Further, when the comparison signal CMP indicates that the target value VID2 is lower than the current value VID1, the delay signal DLY is asserted, and the delay signal DLY is then deasserted after a holding duration Y. On the contrary, when the comparison signal CMP indicates that the target value VID2 is higher than the current value VID1, the delay signal DLY is deasserted.

In this way, the VID command for changing the VID from the current value VID1 to the target value VID2 is delayed to be executed if the target value VID2 is higher than the current value VID1. And accordingly, audible noise is reduced. When the target value VID2 is higher than the current value VID1, the VID command is executed immediately when it is received to change the VID to the target value so as to carry out the next operation.

In one embodiment, the delay signal DLY is deasserted before the holding duration Y when a new target value VID3 is issued from the master device Z01 within the holding duration Y and the new target value VID3 is higher than the previous target value VID2, and the delay signal DLY is reset to be asserted when the new target value VID3 is lower than the previous target value VID2. In such embodiment, the modulation module Z214 is further configured to receive the new target value VID3, wherein the modulation module Z214 is configured to generate the control signal CTRL based on the new target value VID3 when the delay signal DLY is deasserted if the new target value VID3 is received within the holding duration Y.

Persons of ordinary skill in the art will recognize that the approach of correcting audible noise provides the users an option when they run into an audible noise issue. In one embodiment, the users can make their own decisions of whether enabling the audible noise function or not.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

What is claimed is:

1. A method for correcting audible noise from a voltage regulator for supplying a voltage to a master device responsive to a VID indicated by a series of VID commands from the master device, the method comprising:

receiving a VID command of the series of VID commands for changing the VID from a present value to a target value;

holding the VID at the present value if a VID difference between the present value and the target value is larger than a VID threshold, wherein the VID threshold is a non-negative number;

executing the VID command of the series of VID commands if a holding duration for holding the VID at the present value expires and no new VID command for changing the VID is received before the holding duration expires.

2. The method of claim 1, wherein the method further comprises executing a new VID command of the series of VID commands for changing the VID from the present value to a new target value larger than the target value if the new VID command of the series of VID commands is received within the holding duration.

3. The method of claim 1, wherein the method further comprises executing a new VID command of the series of VID commands for changing the VID from the present value to a new target value larger than the present value if the new VID command of the series of VID commands is received within the holding duration.

4. The method of claim 1, wherein the method further comprises executing a new VID command of the series of VID commands for changing the VID from the present value to a new target value larger than the target value and lower than the present value if the new VID command of the series of VID commands is received within the holding duration.

5. The method of claim 1, wherein the method further comprises:

holding the VID at the present value if a new VID command of the series of VID commands for changing the VID from the present value to a new target value lower than the target value is received within the holding duration; and executing the new VID command of the series of VID commands if a new cycle of the holding duration beginning when the new VID command of the series of VID commands is received expires and no new command is received before the new cycle of the holding duration expires.

6. The method of claim 1, wherein the method further comprises executing the VID command of the series of VID commands when the VID command of the series of VID commands is received if the VID difference is lower than the VID threshold.

7. The method of claim 1, wherein the method further comprises holding the VID at the target value when the target value is reached.

8. The method of claim 1, wherein the VID threshold or the holding duration is programmable.

9. The method of claim 1, wherein the method further comprises calculating the VID difference between the present value and the target value and comparing the VID difference with the VID threshold before the step of holding the VID.

10. The method of claim 1, wherein the method further comprises:

deasserting a settle signal for a preset deasserting duration since the VID command of the series of VID commands is received; and asserting an alert signal prompting the master device to read a status register inside the voltage regulator when the settle signal is asserted.

11. A controller for controlling a voltage driver supplying a voltage to a master device responsive to a VID from the master device, the controller comprising:

a calculation module configured to receive a present value and a target value of the VID, and to calculate a VID difference between the present value and the target value;

a first comparison module configured to compare the VID difference with a VID threshold and to provide a first comparison signal, wherein the VID threshold is positive;

a delay module configured to receive the first comparison signal and to generate a delay signal based on the first comparison signal, wherein the delay signal is asserted when the first comparison signal indicates that the VID difference is larger than the VID threshold and deasserted after a holding duration; and a modulation module configured to receive the delay signal, the present value, and the target value of the VID, wherein the modulation module is configured to generate a control signal to control the voltage driver based on the present value of the VID when the delay signal is asserted and based on the target value when the delay signal is deasserted.

12. The controller of claim 11, wherein the controller further comprises a second comparison module configured to receive the target value and a new target value issued from the master device within the holding duration, wherein the second comparison module is configured to compare the target value and the new target value and to generate a second comparison signal;

the delay module is further configured to generate the delay signal based on the second comparison signal, wherein the delay signal is deasserted before the holding duration when the second comparison signal indicates that the new target value is higher than the target value, and the delay signal is reset to be asserted when the second comparison signal indicates that the new target value is lower than the target value; and the modulation module is further configured to receive the new target value, wherein the modulation module is configured to generate the control signal based on the new target value when the delay signal is deasserted.

13. The controller of claim 11, wherein the VID threshold or the holding duration is programmable.

14. A voltage regulator comprising:

a voltage driver for supplying a voltage to a master device responsive to a VID from the master device; and a controller comprising:

a calculation module configured to receive a present value and a target value of the VID, and to calculate a VID difference between the present value and the target value;

a first comparison module configured to compare the VID difference with a VID threshold and to provide a first comparison signal, wherein the VID threshold is positive;

a delay module configured to receive the first comparison signal and to generate a delay signal based on the first comparison signal, wherein the delay signal is asserted when the first comparison signal indicates that the VID difference is larger than the VID threshold and deasserted after a holding duration; and a modulation module configured to receive the delay signal, the present value, and the target value of the VID, wherein the modulation module is configured to generate a control signal to control the voltage driver based on the present value of the VID when the delay signal is asserted and based on the target value when the delay signal is deasserted.

15. The voltage regulator of claim 14, wherein the controller further comprises a second comparison module configured to receive the target value and a new target value issued from the master device within the holding duration, wherein the second comparison module is configured to compare the target value and the new target value and to generate a second comparison signal;

the delay module is further configured to generate the delay signal based on the second comparison signal, wherein the delay signal is deasserted before the holding duration when the second comparison signal indicates that the new target value is higher than the target value, and the delay signal is reset to be asserted when the second comparison signal indicates that the new target value is lower than the target value; and the modulation module is further configured to receive the new target value, wherein the modulation module is configured to generate the control signal based on the new target value when the delay signal is deasserted if the new target value is received within the holding duration.

16. The voltage regulator of claim 14, wherein the VID threshold or the holding duration is programmable.

17. A controller for controlling a voltage driver supplying a voltage to a master device responsive to a VID from the master device, the controller comprising:

a comparison module configured to compare a present value with a target value of the VID and to provide a comparison signal;

a delay module configured to receive the comparison signal and to generate a delay signal based on the comparison signal, wherein the delay signal is asserted when the comparison signal indicates that the target value is lower than the present value and deasserted after a holding duration; and a modulation module configured to receive the delay signal, the present value, and the target value of the VID, wherein the modulation module is configured to generate a control signal to control the voltage driver based on the present value of the VID when the delay signal is asserted and based on the target value when the delay signal is deasserted.

18. The controller of claim 17, wherein the delay signal is deasserted before the holding duration when a new target value issued from the master device within the holding duration is higher than the target value, and the delay signal is reset to be asserted when the new target value is lower than the target value; and wherein the modulation module is further configured to receive the new target value, wherein the modulation module is configured to generate the control signal based on the new target value when the delay signal is deasserted.

19. The controller of claim 17, wherein the holding duration is programmable.

20. A voltage regulator comprising:

a voltage driver for supplying a voltage to a master device responsive to a VID from the master device; and a controller comprising:

a comparison module configured to compare a present value with a target value of the VID and to provide a comparison signal;

a delay module configured to receive the comparison signal and to generate a delay signal based on the comparison signal, wherein the delay signal is asserted when the comparison signal indicates that the target value is lower than the present value and deasserted after a holding duration; and a modulation module configured to receive the delay signal, the present value, and the target value of the VID, wherein the modulation module is configured to generate a control signal to control the voltage driver based on the present value of the VID when the delay signal is asserted and based on the target value when the delay signal is deasserted.

* * * * *